Patented Apr. 10, 1928.

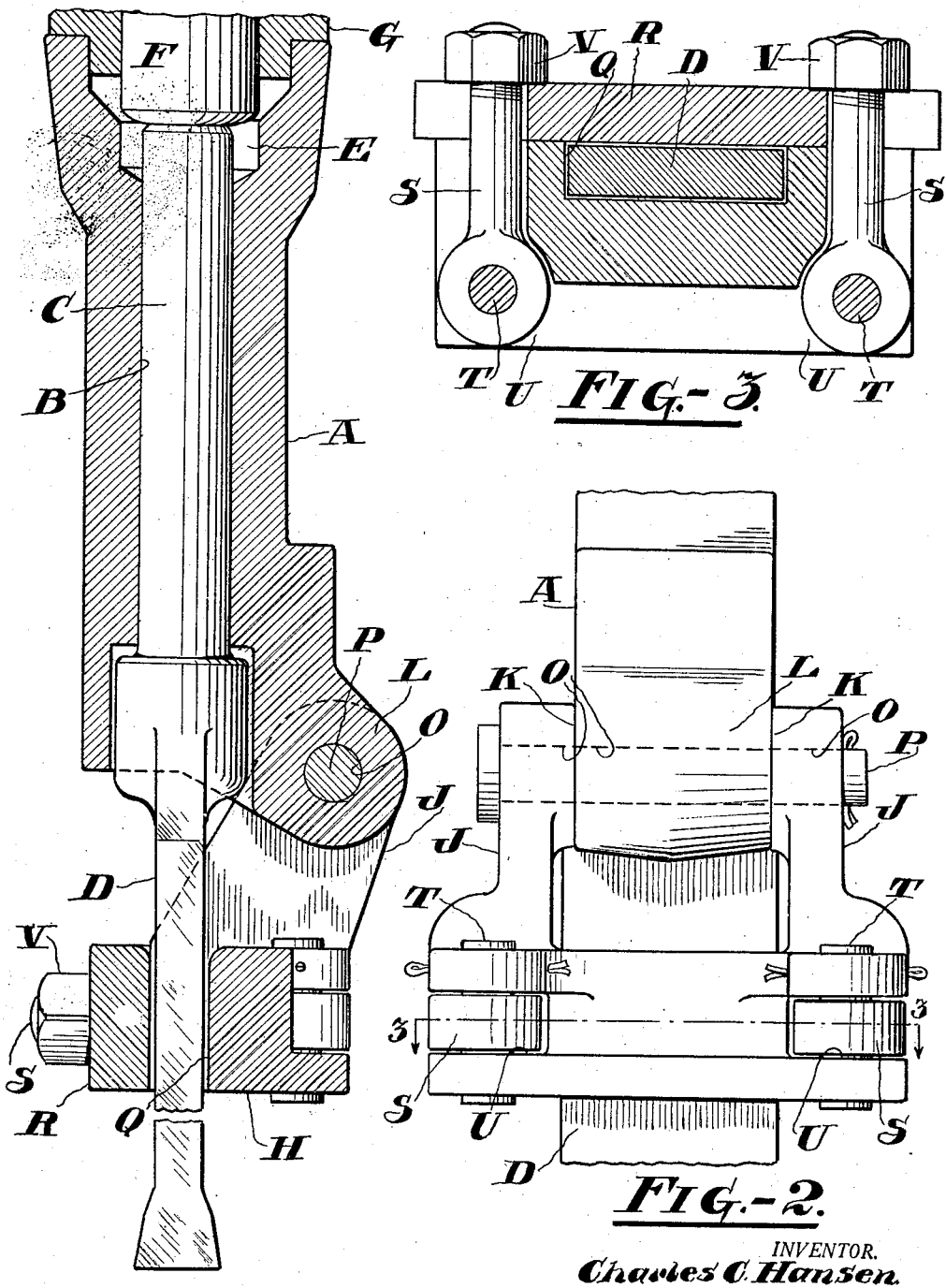

1,665,496

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

GUIDE FOR BROACHING TOOLS.

Application filed December 20, 1926. Serial No. 155,982.

This invention relates to rock drills, but more particularly to a guide for a broaching tool adapted to be actuated by fluid actuated rock drills of the hammer type.

The objects of the invention are to prevent rotation of the broaching tool with respect to the rock drill and to insure retention of the broaching tool in the front head of the drill.

Other objects will appear hereinafter and to all of these ends the invention consists of the combination of elements and features of construction substantially as hereinafter described and claimed and illustrated in the accompanying drawings, in which Figure 1 is a sectional elevation of the front end of a rock drill having the invention applied thereto, Figure 2 is a front elevation of the guide in operative position, and Figure 3 is a transverse view taken through Figure 2 on the line 3—3 looking in the direction of the arrows.

Referring more particularly to the drawings, A represents a front head of a rock drill suitably bored as at B to receive a cylindrical shank C of a flat rectangular broaching tool D. The shank C preferably extends with its rearward end into a recess E in the rearward end of the front head A to receive the blows of a hammer piston F reciprocable in a cylinder G.

Suitable and novel means are provided for preventing relative rotation between the front head A and the broaching tool D, as well as to prevent ejection of the broaching tool D from the front head A. The means in the present instance comprises a guide block H adapted to extend forwardly of the front head and has at its ends rearwardly extending arms J. The arms J are preferably so spaced with respect to each other that when the guide block is secured to the front head A, said arms will engage slidably surfaces K of an enlargement L carried by the front head A. In the present instance the enlargement L and the free ends of the arms J are provided with apertures O for the reception of a bolt or pin P which acts as a pivot for the guide block H.

Formed in one side of the guide block H is a recess Q preferably of slightly greater length and depth than the width and thickness of the broaching tool D which reciprocates in the recess Q. In this way the broaching tool D may move without being in any way retarded by the wall of the said recess Q.

In order that the guide block H may be held in its operative position, a plate R is arranged across the open side of the recess Q to cooperate with the walls of the recess Q for forming guiding surfaces for the tool D. The plate R may be secured to the guide block H in any suitable manner. A convenient means of accomplishing this in the present instance consists of a pair of eye-bolts S pivoted on pins T in the guide block H and adapted to lie in slots U formed in the ends of the plate R, nuts V being disposed on the eye-bolts S for clamping the plate R securely against the guide block H. In this way the broaching tool will at all times be held against rotation by the guide block and the guide block will be held in operative position by the broaching tool.

In practice, whenever it is desired to change broaching tools, the nuts V may be sufficiently unscrewed on the bolts S to enable said bolts to be rocked out of the slots in the plate R. The plate R may then be removed from the guide block H to enable the guide block to be slightly oscillated about its pivot and the broaching tool D may readily be removed from the front head A and another broaching tool may be disposed in the front head. Thereafter the plate R may again be secured to the guide block H.

The present invention has been found to be particularly adapted for application to rock drills equipped with front heads of a known type such that illustrated in the drawings and permits the use of these front heads for broaching operations as well as for drilling operations for which they are primarily intended. By the mere substitution of the broaching tool guide herein described, the rock drill may be readily converted into a broaching machine without necessitating disassembling of the rock drill to replace the front head with the usual type of broaching attachment.

I claim:

1. In a rock drill, the combination of a front head, a flat rectangular broaching tool extending into the front head, and means pivoted on the front head and extending forwardly thereof to guide the broaching tool for preventing rotation of the broaching tool in the front head, said means being held in retaining position by the broaching tool.

2. In a rock drill, the combination of a front head, a flat rectangular broaching tool extending into the front head, a guide block pivoted to the front head, said guide block having a recess to slidably receive the broaching tool at a point forwardly of the front head, and a plate clamped to the guide block forming a closure for one side of the recess.

3. In a rock drill, the combination of a front head, a flat rectangular broaching tool having a cylindrical shank extending into the front head, a guide block, arms on the guide block pivoted to the front head to support the guide block forwardly of the front head, said guide block having a recess to slidably receive the broaching tool, a pin extending through the front head and the arms for pivoting the guide block to the front head, a plate forming a closure for one side of the recess, and bolts pivoted to the guide block for clamping the plate to the guide block.

In testimony whereof I have signed this specification.

CHARLES C. HANSEN.